United States Patent
Lin et al.

(10) Patent No.: US 11,573,160 B2
(45) Date of Patent: Feb. 7, 2023

(54) EVALUATION OF SOLID OXIDE FUEL CELL CATHODE MATERIALS

(71) Applicant: PHILLIPS 66 COMPANY, Houston, TX (US)

(72) Inventors: Ye Lin, Bartlesville, OK (US); Ying Liu, Bartlesville, OK (US); Paul Michael Alvey, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 408 days.

(21) Appl. No.: 16/861,995

(22) Filed: Apr. 29, 2020

(65) Prior Publication Data

US 2020/0355592 A1     Nov. 12, 2020

Related U.S. Application Data

(60) Provisional application No. 62/844,355, filed on May 7, 2019.

(51) Int. Cl.
  *G01N 5/04*     (2006.01)
  *H01M 8/04313*  (2016.01)
  *G01N 5/02*     (2006.01)

(52) U.S. Cl.
  CPC .............. *G01N 5/04* (2013.01); *G01N 5/02* (2013.01); *H01M 8/04313* (2013.01)

(58) Field of Classification Search
  CPC ... H01M 8/04313; H01M 4/90; H01M 6/5083
  See application file for complete search history.

(56) References Cited

U.S. PATENT DOCUMENTS

| | | | |
|---|---|---|---|
| 8,211,579 B2 * | 7/2012 | Igarashi | H01M 8/04559 429/513 |
| 9,093,676 B2 * | 7/2015 | Dileo | H01M 8/04462 |

(Continued)

FOREIGN PATENT DOCUMENTS

| | | | | |
|---|---|---|---|---|
| CN | 101381880 A | * | 3/2009 | .......... H01M 4/8605 |
| CN | 101383416 A | * | 3/2009 | |

(Continued)

OTHER PUBLICATIONS

ESPACENET Machine Translation of CN 101381880 A Which Originally Published On Mar. 11, 2009. (Year: 2009).*

(Continued)

*Primary Examiner* — David A. Rogers
(74) *Attorney, Agent, or Firm* — Phillips 66 Company

(57) ABSTRACT

A method for determining the oxygen surface exchange property of a material in a solid oxide fuel cell. The method begins by first receiving a data stream comprising of continuous weight measurements of the material and time measurements of when the continuous weight measurements of the material are taken. While receiving the data stream an oxygen concentration test is performed which involves: flowing a degradation gas flow onto the cathode material while simultaneously increasing the temperature of the primary gas flow to a set temperature, flowing the degradation gas flow onto the material at the set temperature, stopping the degradation gas flow and starting a primary gas flow at the set temperature, flowing the primary gas flow onto the material at the set temperature, and stopping the primary gas flow and starting a secondary gas flow at the set temperature. This data stream is then displayed analyzing the weight change of the material over time.

10 Claims, 7 Drawing Sheets

(56) References Cited

U.S. PATENT DOCUMENTS

| | | | | |
|---|---|---|---|---|
| 9,379,398 B2* | 6/2016 | Niangar | ............. | H01M 8/0447 |
| 10,062,908 B2* | 8/2018 | Seong | ................ | H01M 8/1213 |
| 11,316,169 B2* | 4/2022 | Song | ................ | H01M 4/8657 |
| 11,322,768 B2* | 5/2022 | Lin | ...................... | H01M 8/126 |
| 11,349,130 B2* | 5/2022 | Lin | ................... | H01M 4/8892 |
| 2012/0270139 A1* | 10/2012 | Park | ....................... | C04B 35/50 |
| | | | | 252/182.1 |
| 2013/0157153 A1* | 6/2013 | Niangar | ............. | H01M 8/0662 |
| | | | | 429/414 |
| 2018/0175396 A1* | 6/2018 | Jacobs | ............... | H01M 4/9033 |
| 2019/0379057 A1* | 12/2019 | Song | ................ | C23C 16/45531 |

FOREIGN PATENT DOCUMENTS

| | | | | |
|---|---|---|---|---|
| EP | 2830137 B1 * | 4/2019 | ............ | B32B 18/00 |
| EP | 3499617 B1 * | 3/2021 | ............ | C25B 11/04 |

OTHER PUBLICATIONS

ESPACENET Machine Translation of CN 101383416 A Which Originally Published On Mar. 11, 2009. (Year: 2009).*

\* cited by examiner

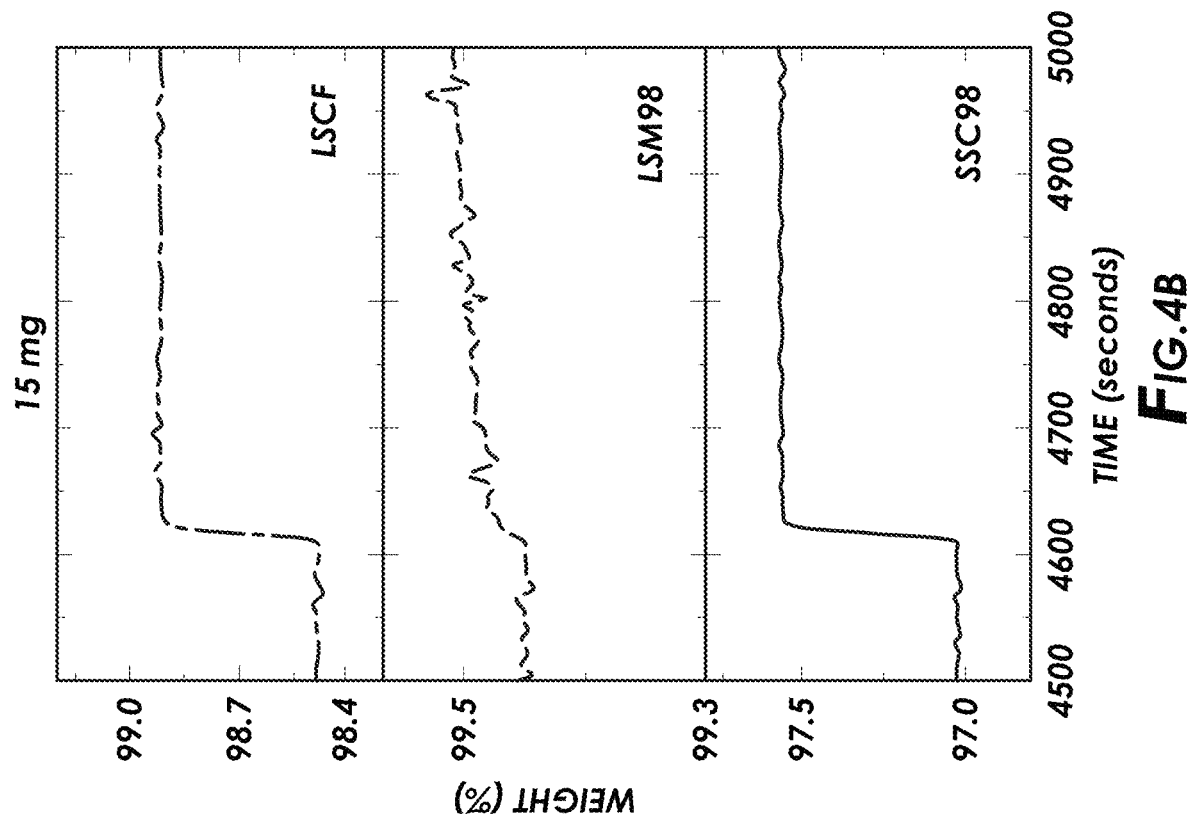
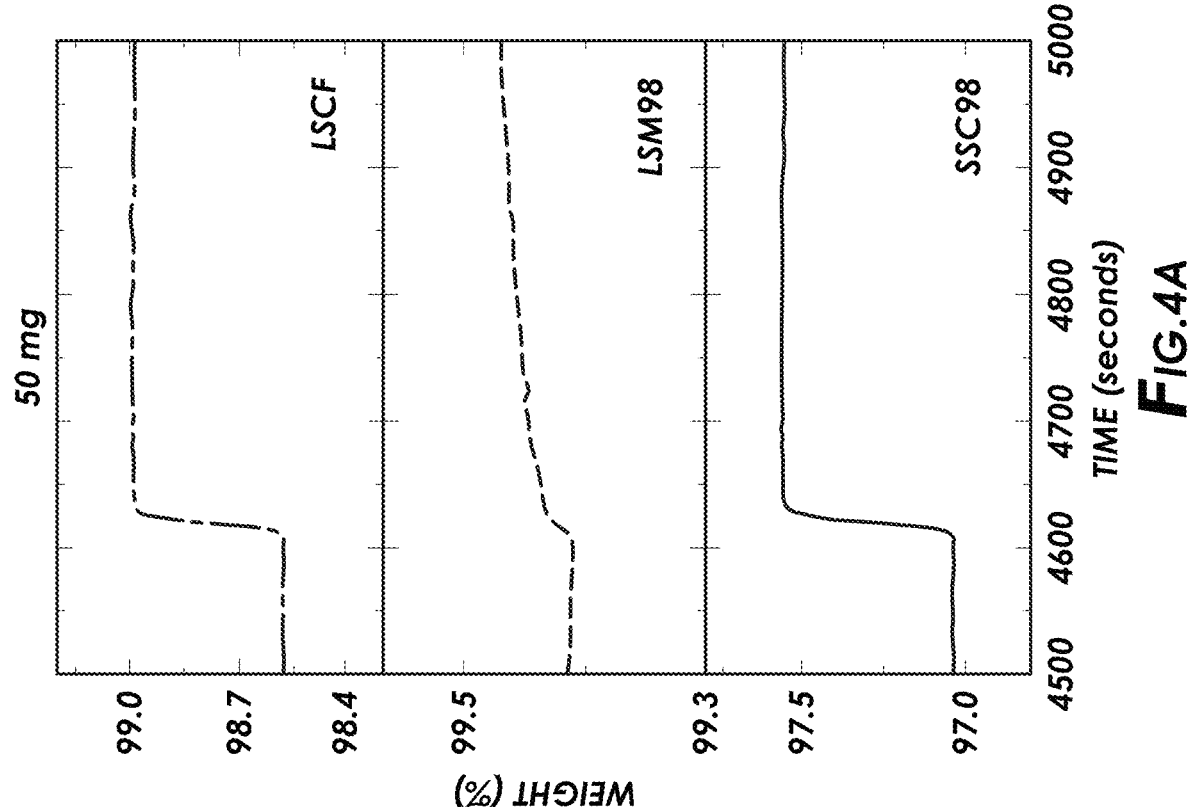

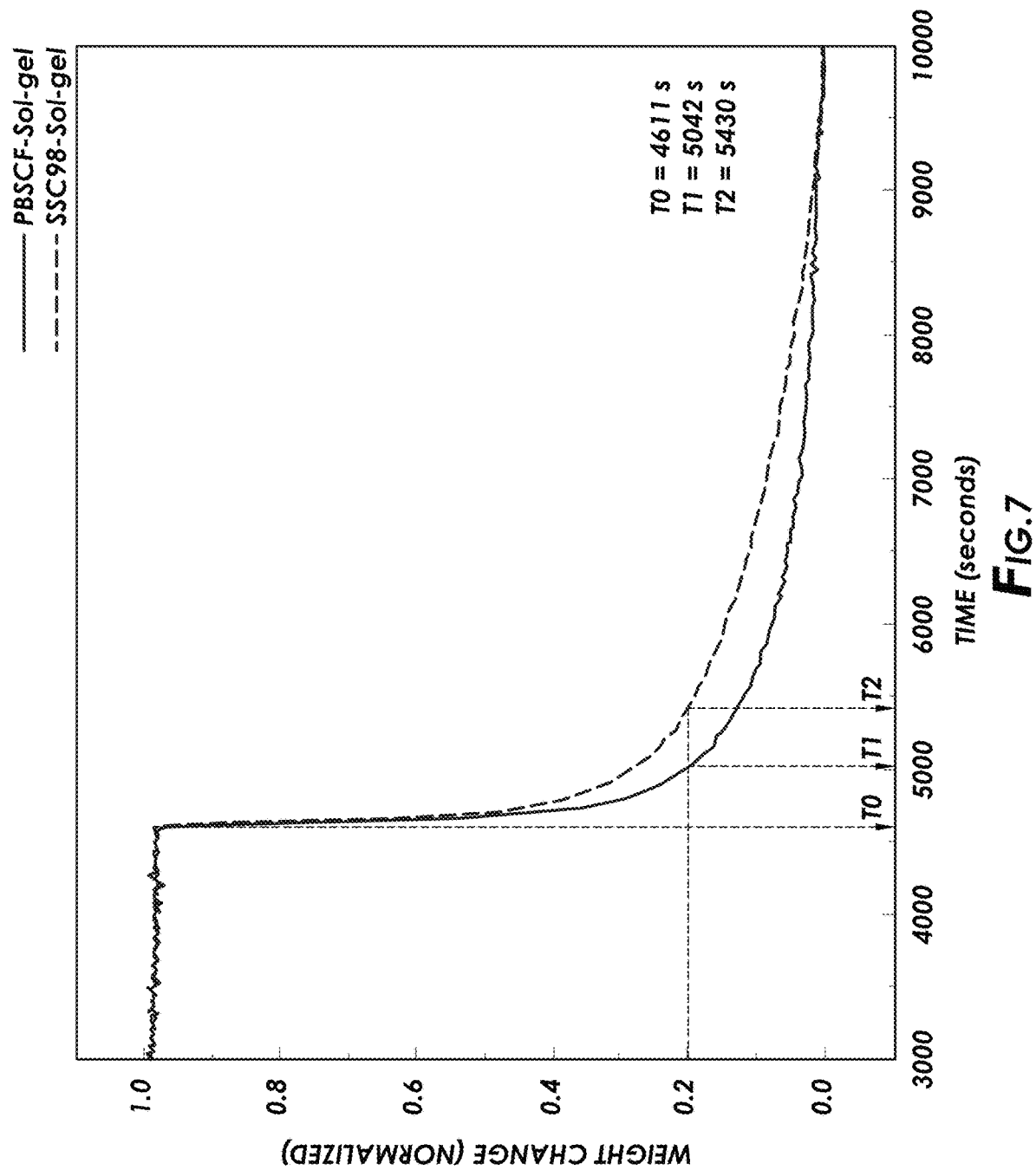

EVALUATION OF SOLID OXIDE FUEL CELL CATHODE MATERIALS

CROSS-REFERENCE TO RELATED APPLICATIONS

This application is a non-provisional application which claims the benefit of and priority to U.S. Provisional Application Ser. No. 62/844,355 filed May 7, 2019, titled "Evaluation of Solid Oxide Fuel Cell Cathode Materials," which is hereby incorporated by reference in its entirety.

STATEMENT REGARDING FEDERALLY SPONSORED RESEARCH OR DEVELOPMENT

None.

FIELD OF THE INVENTION

This invention relates to a novel method of evaluating solid oxide fuel cell cathode materials.

BACKGROUND OF THE INVENTION

Solid Oxide Fuel Cells (SOFC) provide an alternative way to convert fossil fuels or hydrogen into electrical power. They are more efficient than any combustion engines because they can generate electricity beyond the limitation of the Carnot Cycle. Their versatility lends them to a variety of applications, like supplying power to communities and extending the driving range of vehicles. Another advantage is that they generate power off the electrical grid by running on pipeline natural gas. The on-demand and on-site power generation by SOFCs could play a vital role in future energy generation markets.

The evaluation of cathode material performance usually involves multiple steps that are very time consuming. Oxygen surface exchange coefficient and bulk diffusion coefficient are key characteristics that contribute to the cathode performance. These properties can be measured using electrical conductivity relaxation, which monitors the electrical conductivity change and equilibration time during an abrupt change in oxygen partial pressure.

The method of electrical conductivity relaxation (ECR) is a long and complex method where the cathode powder is first mixed with a small amount of binder and pressed into a special-steel bar mold. The bar-shaped sample is then placed in a high temperature furnace and allowed to sinter to full density. After cooling to room temperature, the electrical conductivity of the finished cathode bar is tested in another furnace at different temperature and oxygen partial pressure combinations using a standard four-point probe method. It is extremely difficult to achieve full density by high temperature sintering and any porosity in the sample will reduce its measured electrical conductivity. Moreover, over-sintering can result in evaporation of the more volatile elements. The total time required for the electrical conductivity relaxation method can be several days or a few weeks. Due to these drawbacks, there exists a need for a high throughput method that can rapidly screen cathode materials with high accuracy.

BRIEF SUMMARY OF THE DISCLOSURE

A method for determining the oxygen surface exchange property of a material in a solid oxide fuel cell. The method begins by first receiving a data stream comprising of continuous weight measurements of the material and time measurements when the continuous weight measurements of the material are taken. While receiving the data stream an environment change test is performed which involves: flowing a degradation gas flow onto the cathode material while simultaneously increasing the temperature of the primary gas flow to a set temperature, flowing the degradation gas flow onto the material at the set temperature, stopping the degradation gas flow and starting a primary gas flow at the set temperature, flowing the primary gas flow onto the material at the set temperature, and stopping the primary gas flow and starting a secondary gas flow at the set temperature. This data stream is then displayed analyzing the weight change of the material over time.

In an alternate embodiment, the method is for determining the oxygen surface exchange property of a cathode material in a solid oxide fuel cell. The method first begins by receiving a data stream comprising of continuous weight measurements of the cathode material and time measurements of when the continuous weight measurements of the cathode material are taken. While receiving the data stream an oxygen concentration test is performed which involves: flowing a degradation gas flow onto the material while simultaneously increasing the temperature of the primary gas flow to a set temperature, flowing the degradation gas flow onto the cathode material at the set temperature till the weight measurement of the cathode material is stable, stopping the degradation gas flow and starting a primary gas flow onto the cathode material at the set temperature, flowing the primary gas flow onto the material at the set temperature till the weight measurement of the cathode material is stable, and stopping the primary gas flow and starting a secondary gas flow at the set temperature till the weight measurement of the cathode material is stable while flowing the secondary gas flow. The data stream is then displayed and analyzed showing the data stream of the cathode material over time wherein $T(0)$ is the time in which the weight change of cathode material begins and $T(x)$ is the time in which the cathode material has changed Y weight.

In yet another embodiment, the method is for determining the oxygen surface exchange property of a cathode material in a solid oxide fuel cell. The method first begins by receiving a data stream comprising of continuous weight measurements of the cathode material and time measurements of when the continuous weight measurements of the cathode material are taken. While receiving the data stream an oxygen concentration test is performed which involves: flowing a degradation gas flow onto the cathode material while simultaneously increasing the temperature of the degradation gas flow to a set temperature, wherein the degradation gas flow contains $CO_2$, flowing the degradation gas flow onto the cathode material at the set temperature till the weight measurement of the cathode material is stable, stopping the degradation gas flow and starting a primary gas flow onto the cathode material at the set temperature, wherein the primary gas flow contains oxygen, flowing the primary gas flow onto the material at the set temperature till the weight measurement of the cathode material is stable, stopping the primary gas flow and starting a secondary gas flow at the set temperature till the weight measurement of the cathode material is stable while flowing the secondary gas flow, wherein the secondary gas flow does not contain oxygen, and stopping the secondary gas flow and starting a primary gas flow at the set temperature till the weight measurement of the cathode material is stable while flowing the primary gas flow. The data stream is then displayed and analyzed showing the data stream of the cathode material over time wherein $T(0i)$ is the time in which the weight change of cathode material begins from primary gas flow to secondary gas flow, T(xi) is the time in which the cathode material has changed Y weight from primary gas flow to secondary gas flow, T(0ii) is the time in which the weight change of cathode material begins from secondary gas flow to primary gas flow, and T(xii) is the time in which the cathode material has changed Z weight from secondary gas flow to primary gas flow.

BRIEF DESCRIPTION OF THE DRAWINGS

A more complete understanding of the present invention and benefits thereof may be acquired by referring to the follow description taken in conjunction with the accompanying drawings in which:

FIGS. 4a and b depict sample weight of the material versus data quality.
FIG. 7 depicts a normalized reduction relaxation profile for the two materials.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
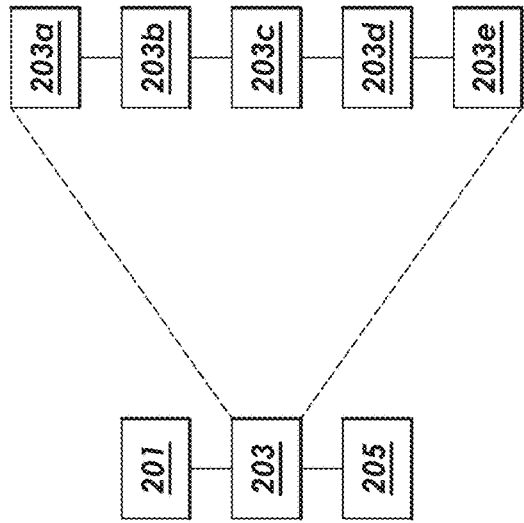
FIG. 1 depicts an embodiment of the method.

A method for determining the oxygen surface exchange property of a material in a solid oxide fuel cell. As shown in FIG. 1, the method begins by first receiving a data stream comprising of continuous weight measurements of the material and time measurements when the continuous weight measurements of the material are taken. (101) While receiving the data stream an environment change test is performed (103) which involves: flowing a degradation gas flow onto the material while simultaneously increasing the temperature of the primary gas flow to a set temperature (103a); flowing the degradation gas flow onto the material at the set temperature (103b); stopping the degradation gas flow and starting a primary gas flow at the set temperature (103c); flowing the primary gas flow onto the material at the set temperature (103d), and stopping the primary gas flow and starting a secondary gas flow at the set temperature (103e). This data stream is then displayed analyzing the weight change of the material over time (105).

Figure 2:
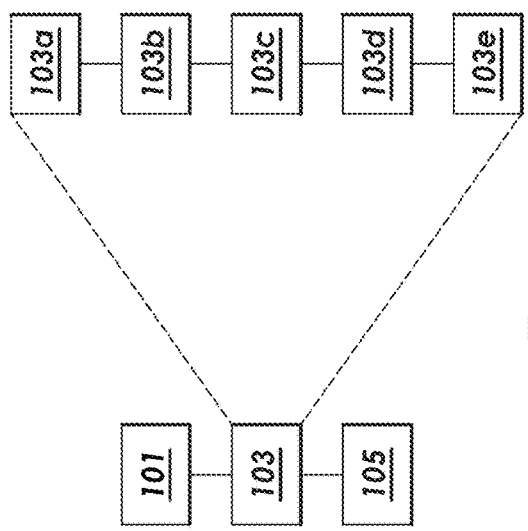
FIG. 2 depicts an embodiment of the method.

In an alternate embodiment as shown in FIG. 2, the method is for determining the oxygen surface exchange property of a cathode material in a solid oxide fuel cell. The method first begins by receiving a data stream comprising of continuous weight measurements of the cathode material and time measurements of when the continuous weight measurements of the cathode material are taken (201). While receiving the data stream an oxygen concentration test is performed (203) which involves: flowing a degradation gas flow onto the material while simultaneously increasing the temperature of the primary gas flow to a set temperature (203a), flowing the degradation gas flow onto the cathode material at the set temperature till the weight measurement of the cathode material is stable (203b); stopping the degradation gas flow and starting a primary gas flow onto the cathode material at the set temperature (203c); flowing the primary gas flow onto the material at the set temperature till the weight measurement of the cathode material is stable (203d); and stopping the primary gas flow and starting a secondary gas flow at the set temperature till the weight measurement of the cathode material is stable while flowing the secondary gas flow (203e). The data stream is then displayed and analyzed showing the data stream of the cathode material over time wherein T(0) is the time in which the weight change of cathode material begins and T(x) is the time in which the cathode material has changed Y weight (205).

Figure 3:
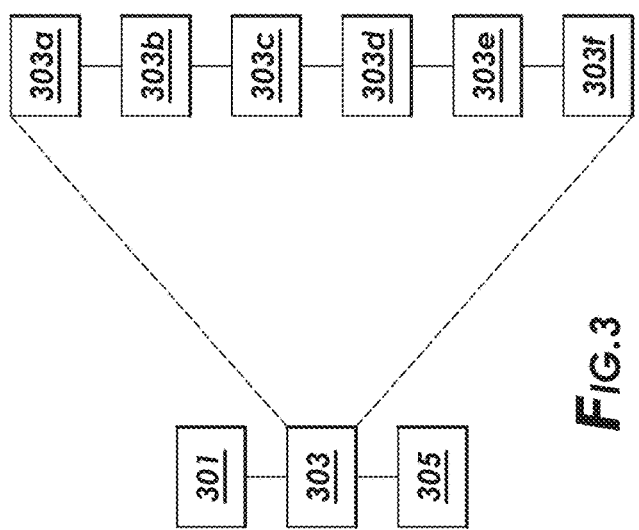
FIG. 3 depicts an embodiment of the method.

In yet another embodiment as shown in FIG. 3, the method is for determining the oxygen surface exchange property of a cathode material in a solid oxide fuel cell. The method first begins by receiving a data stream comprising of continuous weight measurements of the cathode material and time measurements of when the continuous weight measurements of the cathode material are taken (301). While receiving the data stream an oxygen concentration test is performed which involves (303): flowing a degradation gas flow onto the cathode material while simultaneously increasing the temperature of the degradation gas flow to a set temperature, wherein the degradation gas flow contains $CO_2$ (303a); flowing the degradation gas flow onto the cathode material at the set temperature till the weight measurement of the cathode material is stable (303b); stopping the degradation gas flow and starting a primary gas flow onto the cathode material at the set temperature, wherein the primary gas flow contains oxygen (303c); flowing the primary gas flow onto the material at the set temperature till the weight measurement of the cathode material is stable (303d); stopping the primary gas flow and starting a secondary gas flow at the set temperature till the weight measurement of the cathode material is stable while flowing the secondary gas flow, wherein the secondary gas flow does not contain oxygen (303e), and stopping the secondary gas flow and starting a primary gas flow at the set temperature till the weight measurement of the cathode material is stable while flowing the primary gas flow (303f). The data stream is then displayed and analyzed showing the data stream of the cathode material over time wherein T(0i) is the time in which the weight change of cathode material begins from primary gas flow to secondary gas flow, T(xi) is the time in which the cathode material has changed Y weight from primary gas flow to secondary gas flow, T(0ii) is the time in which the weight change of cathode material begins from secondary gas flow to primary gas flow, and T(xii) is the time in which the cathode material has changed Z weight from secondary gas flow to primary gas flow (305).

In one embodiment the material can be any material currently used in SOFC's. This can be either the cathode, the anode, or even both the cathode and anode. The material can be of any form including power, pellet, or even lump.

The amount of material to be tested can range from 5 mg to even 200 mg. For comparisons it would be ideal but not necessary that the amount of material used for the oxygen concentration test is identical for each sample. In some embodiments, the material weight can be 5 mg, 10 mg, 15 mg, 20 mg, 25 mg, 30 mg, 35 mg, 40 mg, 45 mg, 50 mg, 55 mg, 60 mg, 70 mg, 80 mg, 90 mg, or even 100 mg. In other embodiments, the material weight can range from about 40 mg to about 75 mg. FIGS. 4a and b demonstrate how sample weight can influence data quality. For example, three SOFC cathode materials, $La_{0.6}Sr_{0.4}Co_{0.2}Fe_{0.8}O_3$ (LSCF), $(La_{0.75}Sr_{0.25})_{0.98}MnO_3$ (LSM98), and $(Sm_{0.5}Sr_{0.5})_{0.98}CoO_3$ (SSC98) were measured by the weight relaxation method. All three materials in FIG. 4 exhibited a noisier signal with 15 mg than 50 mg. Larger amounts of sample (e.g. 100 mg) can further improve signal quality but delay measured relaxation.

To obtain the continuous stream of data from the continuous weight measurements and the time in which the continuous weight measurements of the material are taken, the material is placed on a scale. More specifically, the material can be placed on a device capable of performing thermogravimetry analysis. Any conventional thermogravimetric analyzer that continuously measures mass while the temperature of a sample is changed over time can be used.

The oxygen concentration test can be run while obtaining the continuous stream of data. In one embodiment, the flow of the primary gas flow and the flow of the secondary gas flow are used to simulate oxygen relations direction, either adsorption or desorption. In one embodiment, the material is held under high or low oxygen partial pressure at a specified temperature until the weight reaches a relatively steady state. Afterwards, the oxygen partial pressure is abruptly reversed and an instrument records the weight change associated with oxygen adsorption or desorption.

The degradation gas can be any amount of gas with greater than 0.4% $CO_2$. In other embodiments, the degradation gas can contain up to 40% $CO_2$.

The primary gas and the secondary gas can either have high oxygen partial pressure or low oxygen partial pressure. Examples of high oxygen partial pressure include ambient airpure oxygen, mixtures of nitrogen and 10-100% oxygen, mixtures of argon and 10-100% oxygen. Examples of low oxygen partial pressure include halogens such as pure argon environments or even pure nitrogen environments. In one embodiment, if the primary gas is high oxygen partial pressure then the secondary gas would have low oxygen partial pressure. In another embodiment, if the primary gas is low oxygen partial pressure then the secondary gas would have high oxygen partial pressure.

Figure 5A:
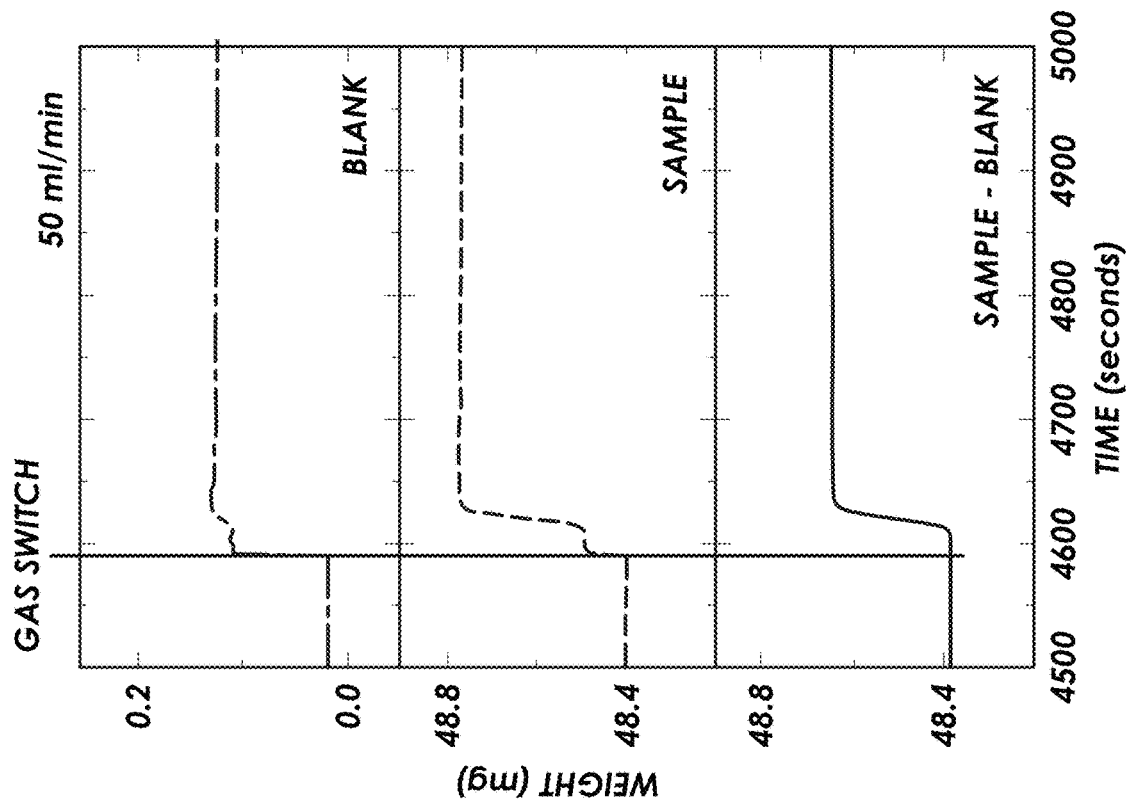
FIGS. 5a and b depict the switch from a primary gas flow to a secondary gas flow.
Figure 5B:
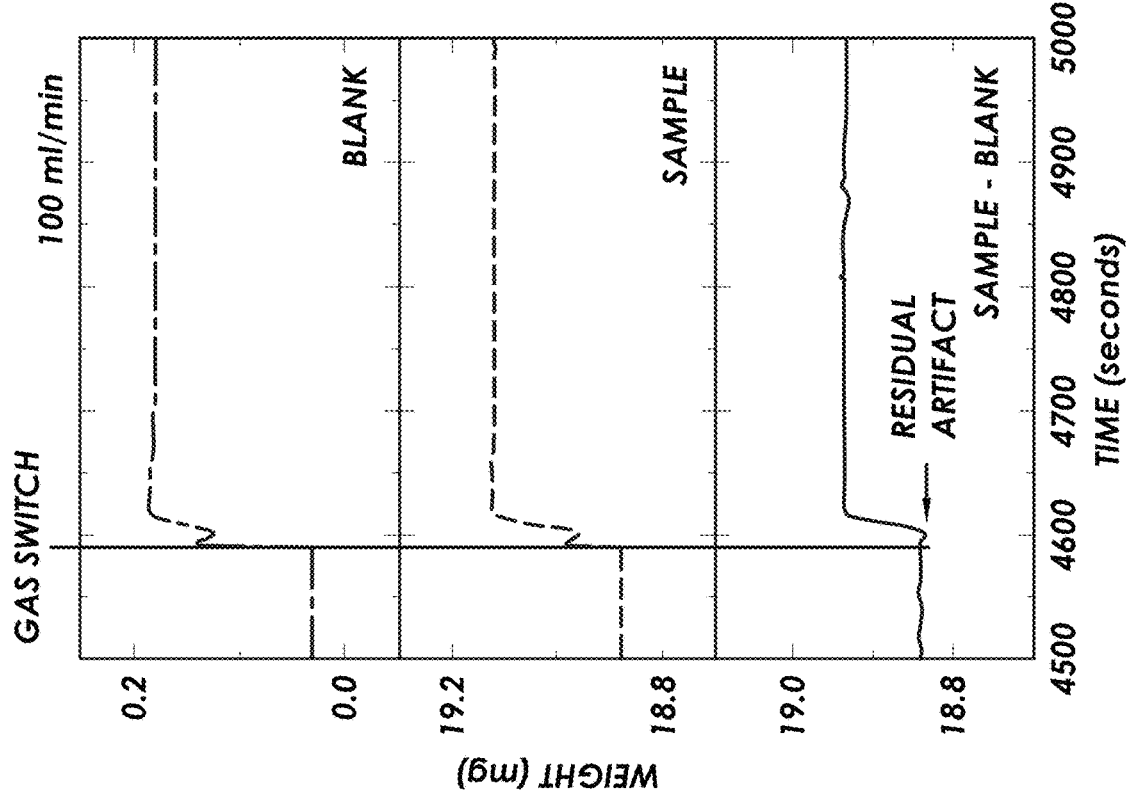

The primary gas flow rate and the secondary gas flow rate can have an influence on the relaxation profile. FIGS. 5a and b highlight an artifact that occurs during an abrupt change from argon to air. A fluctuation will always occur in the weight signal during a segment or gas change. Ideally, it will occur to the same extent in the blank and sample curves such that the fluctuation is completely removed by subtracting the blank from the sample. This correction requires the blank to serve as an approximate substitute for the sample in terms of volume, weight, material, etc.

The fluctuation is likely caused by a combination of factors such as turbulence and a density change inside the furnace. When subtracting a blank curve, a residual artifact may manifest itself in the sample curve if the fluctuations in the blank and sample curves do not match perfectly. As a result, this artifact could be misinterpreted as a dip in the oxidation relaxation process.

The relative intensity of the signal fluctuation upon changing gases can be significantly reduced by using lower flow rates. FIG. 2 shows a dramatic reduction in the signal fluctuation when lowering the gas flow from 100 ml/min to 50 ml/min. It is theorized that a slower gas flow will result in a slower weight change. In one embodiment, the gas flow can be from 30 ml/min up to 100 ml/min, or even 40 ml/min to 60 ml/min.

The set temperature that the oxygen concentration test attempts to achieve can be any corresponding and conventional SOFC operating temperature. In one embodiment, the temperature can be 650° C. In other embodiments, the temperature can be anywhere from about 450° C. to about 800° C.

Figure 6:
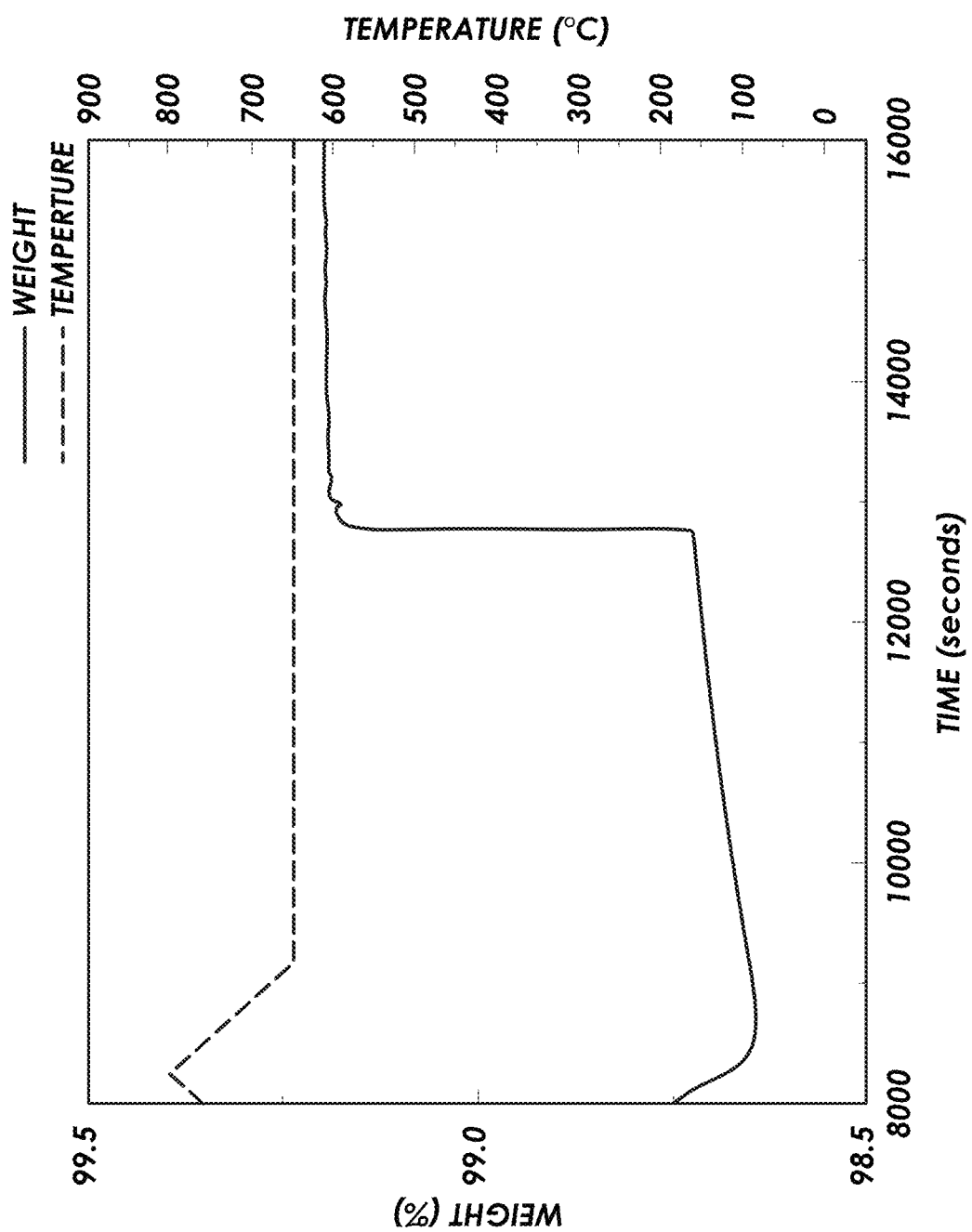
FIG. 6 depicts the weight change from a secondary gas flow to a primary gas flow.

The oxygen concentration test requires a stable weight prior to the gas switch to ensure an accurate and repeatable result. FIG. 6 depicts a weight change from argon to air after a material was held under an argon environment for an hour. This measurement was an investigatory run that cooled the material from a higher temperature prior to the gas switch. It demonstrates that one hour was not enough time to achieve baseline stabilization because the signal continued to rise before the switch. In this case, an analysis would overestimate the weight change as the stabilized weight would be heavier if given enough time to stabilize.

The following examples of certain embodiments of the invention are given. Each example is provided by way of explanation of the invention, one of many embodiments of the invention, and the following examples should not be read to limit, or define, the scope of the invention.

Example 1

Approximately 50 mg of a cathode powder was placed in a 150 μL alumina crucible with an internal radius of 7 mm and an internal depth of 4 mm. The prepared crucibles were placed on the instrument carousel and a robotic system inserted each sample into the furnace for measurement.

The oxygen concentration test was performed on a thermogravimetric analyzer. The reactive or furnace gas was argon for the low oxygen partial pressure (50 ml/min) and cylinder air for the high oxygen partial pressure (50 ml/min).

The following tests were performed for two different materials.
Method 1—Low to High Oxygen Partial Pressure
(1) 25 to 600° C., 50° C./min (Argon)
(2) 600 to 650° C., 10° C./min (Argon)
(3) 650° C., 60 min (Argon) (4) 650° C., 30 min (Air)
Method 2—High to Low & Low to High Oxygen Partial Pressure
(1) 25 to 600° C., 50° C./min (Air)
(2) 600 to 650° C., 10° C./min (Air)
(3) 650° C., 60 min (Air)
(4) 650° C., 120 min (Argon)
(5) 650° C., 30 min (Air)

The relaxation process lasted tens of seconds for small amounts of powder. The data quality was enhanced by collecting more data points in a fixed time range. Data was collected every 0.2 seconds to obtain enough points for a reliable relaxation profile. This means that for a quick relaxation process that lasts only 10 seconds, 50 data points are collected for the final relaxation profile. A blank curve (i.e. measurement with empty crucible) was subtracted from the sample curve to correct buoyancy artifacts and fluctuations associated with segment or gas changes. It was important to ensure that the blank matches the sample in this regard to remove all possible artifacts in the sample signal.

The time at the beginning of the weight change is defined as $T(0)$. The time at a certain weight or relative weight ratio after normalization is defined as $T(x)$. Equilibration time $T(e)$ is defined as $T(e)=T(x)-T(0)$.

It is theorized that a smaller T(e) indicates a better performing cathode material because it will desorb or absorb oxygen faster. Thus, T(e) can be used to compare the cathode material performance.

FIG. 7 depicts a normalized reduction relaxation profile for the two materials. $PrBa_{0.5}Sr_{0.5}Co_{0.8}Fe_{0.2}O_5$(PBSCF) and SSC98. When switching from high oxygen concentration to low oxygen partial pressure (Method 2), It took 819 seconds for SSC98 cathode to lose 80% of absorbed oxygen while the time was reduced to 431 seconds for PBSCF, indicating faster surface oxygen exchange kinetics for PBSCF.

Figures 8A, 8B:
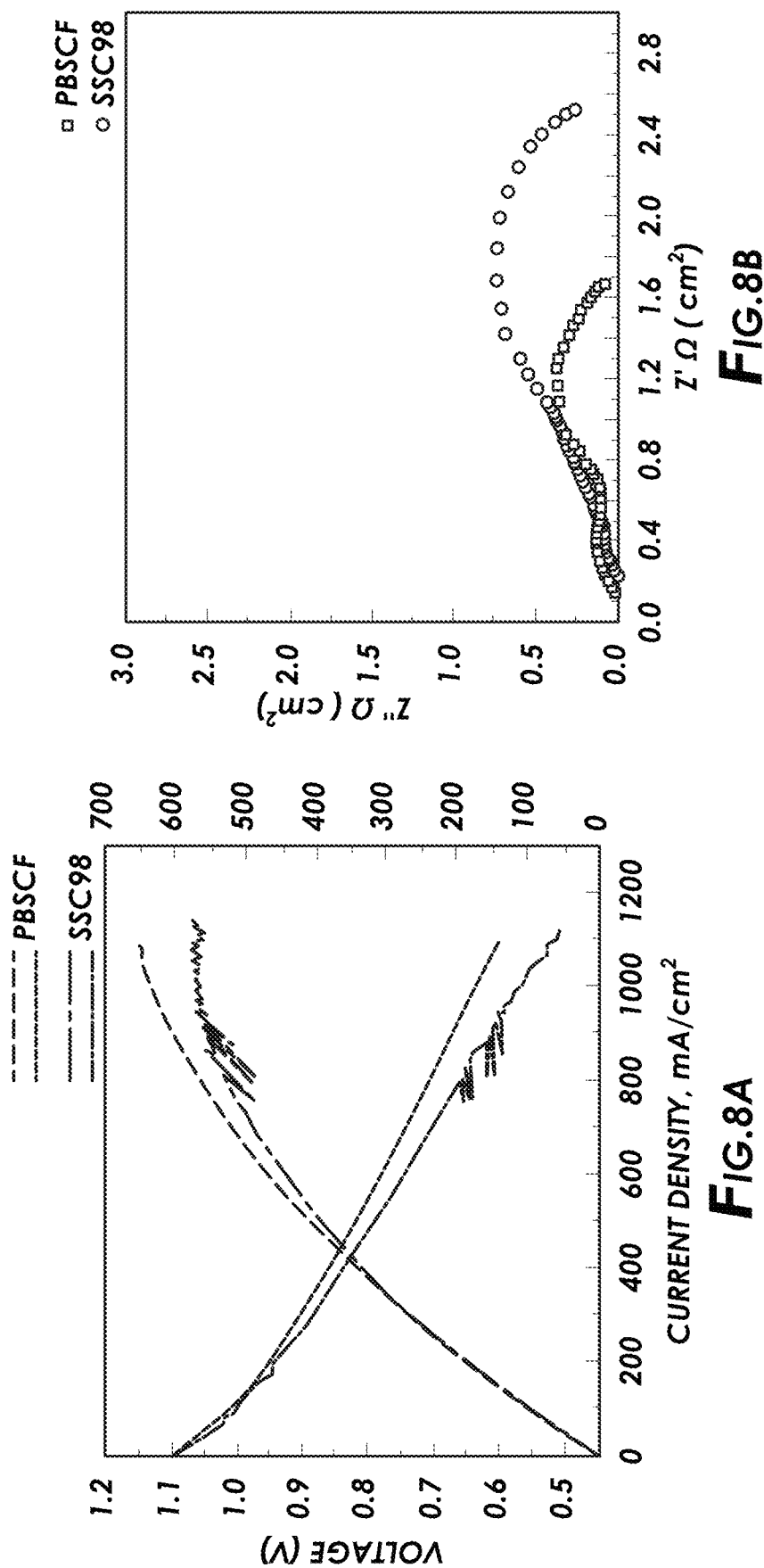
FIGS. 8a and b depict corresponding current-voltage curves, power density and fuel cell impedance for the two materials.

FIGS. 8a and b depict corresponding current-voltage curves, power density and fuel cell impedance for the two materials. With enhanced surface oxygen exchange kinetics, PBSCF cathode resulted in smaller area specific resistances and much higher fuel cell performance than SSC98 cathode.

Example 2

The novel method as described in Example 1 above was applied to four known cathode materials. As depicted in Table 1, the results were compared to known symmetrical cell test data and known electrical conductivity relation test data.

TABLE 1

| | Method Time for 50% weight change (s) | Symmetrical Cell Test Area specific resistance ($\Omega$ cm$^2$) | Electrical Conductivity Relaxation Test Surface exchange coefficient, k (cm/s) |
|---|---|---|---|
| $Sm_{0.5}Sr_{0.5}CoO_3$ | 80 | 0.08 | 1.95E-05 |
| $La_{0.8}Sr_{0.2}CoO_3$ | 109 | 0.24 | 3.00E-06 |
| $La_{0.6}Sr_{0.4}Co_{0.2}Fe_{0.8}O_3$ | 213 | 0.33 | 1.50E-06 |
| $La_{0.75}Sr_{0.25}MnO_3$ | 516 | 111.84 | 4.17E-09 |

Example 3

Figure 9:
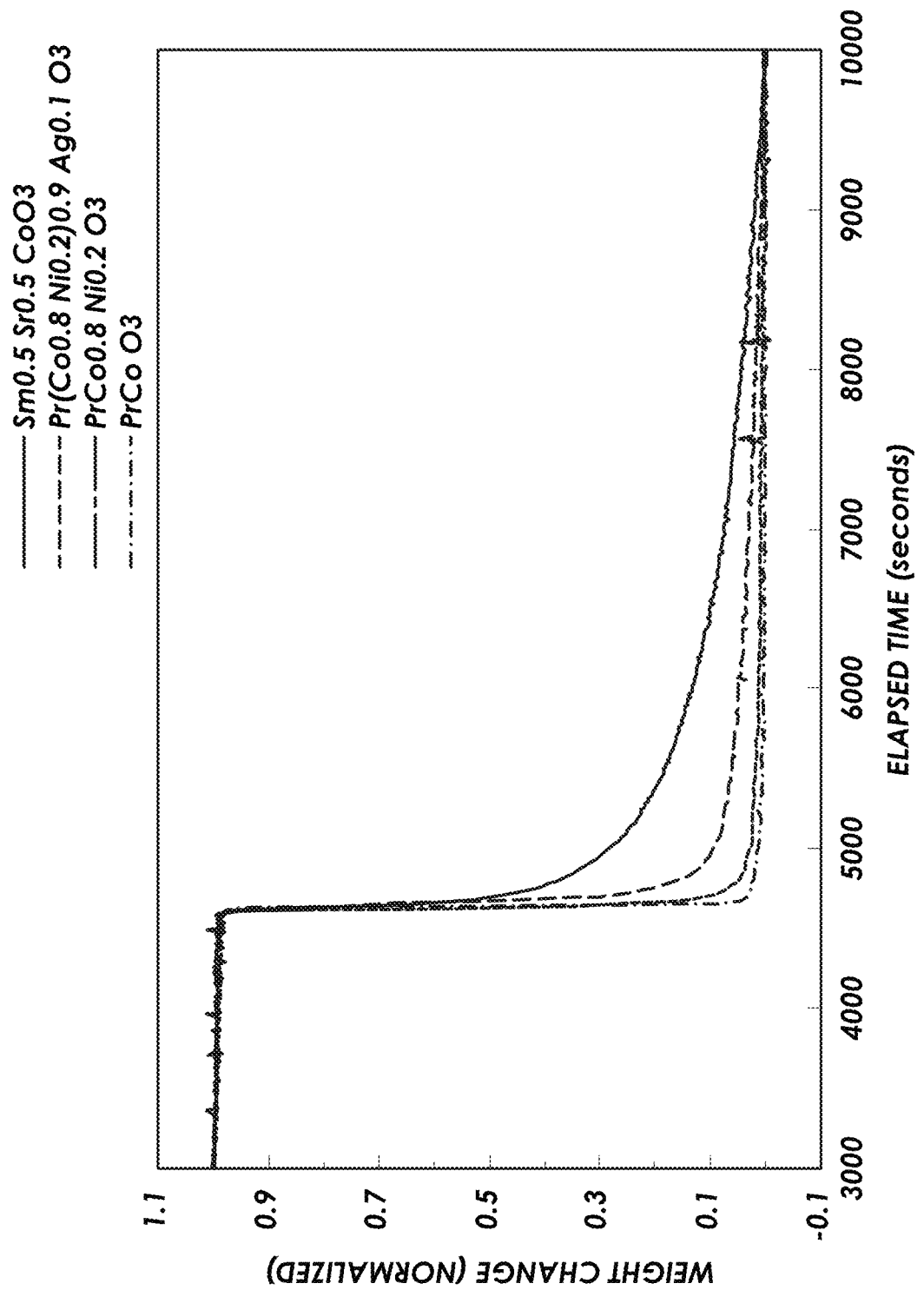
FIG. 9 depicts a normalized reduction relaxation profile for the three new compositions compared with state-of-the-art cathode material, $Sm_{0.5}Sr_{0.5}CoO_3$(SSC).

The novel method as described in Example 1 above was applied to three new cathode compositions, $PrCoO_3$, $PrCo_{0.8}Ni_{0.2}O_3$, and $Pr(Co_{0.8}Ni_{0.2})_{0.9}Ag_{0.1}O_3$. As depicted in FIG. 9, all three new materials exhibited faster surface oxygen exchange kinetics that state-of-the-art cathode SSC.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method for determining the oxygen surface exchange property of a material in a solid oxide fuel cell, comprising the steps of:
   receiving a data stream comprising of continuous weight measurements of the material and time measurements of when the continuous weight measurements of the material are taken;
   receiving the data stream while performing an oxygen concentration test comprising:
   a) flowing a degradation gas flow onto the material while simultaneously increasing the temperature of the primary gas flow to a set temperature;
   b) flowing the degradation gas flow onto the material at the set temperature;
   c) stopping the degradation gas flow and starting a primary gas flow at the set temperature;
   d) flowing the primary gas flow onto the material at the set temperature; and
   e) stopping the primary gas flow and starting a secondary gas flow at the set temperature; and
   displaying the data stream analyzing the weight change of the material over time and determining the oxygen exchange property of the solid oxide fuel cell.

2. The method of claim 1, wherein the material is a cathode material.

3. The method of claim 1, wherein the primary gas flow is stopped when the weight change of the material is stable.

4. The method of claim 1, wherein the secondary gas flow is stopped when the weight change of the material is stable.

5. The method of claim 1, wherein the weight change of the material over time is compared to the weight change of a known material subject to the same oxygen concentration test.

6. The method of claim 1, wherein the degradation gas comprises greater than 0.4% $CO_2$.

7. The method of claim 1, wherein the set temperature ranges from about 450° C. to about 800° C.

8. A method for determining the oxygen concentration of a cathode material in a solid oxide fuel cell, comprising the steps of:
   receiving a data stream comprising of continuous weight measurements of the cathode material and time measurements of when the continuous weight measurements of the cathode material are taken;
   receiving the data stream while performing an oxygen concentration test comprising:
   a) flowing a degradation gas flow onto the cathode material while simultaneously increasing the temperature of the primary gas flow to a set temperature;
   b) flowing the degradation gas flow onto the cathode material at the set temperature till the weight measurement of the cathode material is stable;
   c) stopping the degradation gas flow and starting a primary gas flow onto the cathode material at the set temperature;
   d) flowing the primary gas flow onto the material at the set temperature till the weight measurement of the cathode material is stable; and
   e) stopping the primary gas flow and starting a secondary gas flow at the set temperature till the weight measurement of the cathode material is stable while flowing the secondary gas flow; and
   displaying and analyzing the data stream of the cathode material over time wherein T(0) is the time in which the weight change of cathode material begins and T(x) is the time in which the cathode material has changed Y weight and determining the oxygen exchange property of the solid oxide fuel cell.

9. The method of claim 8, wherein $T(0)$ and $T(x)$ are compared to $T(0)$ and $T(x)$ of a known cathode material subject to the same oxygen concentration test.

10. A method for determining the oxygen surface exchange property of a cathode material in a solid oxide fuel cell, comprising the steps of:

receiving a data stream comprising of continuous weight measurements of the cathode material and time measurements of when the continuous weight measurements of the cathode material are taken;

receiving the data stream while performing an oxygen concentration test comprising:
a) flowing a degradation gas flow onto the cathode material while simultaneously increasing the temperature of the degradation gas flow to a set temperature, wherein the degradation gas flow contains $CO_2$;
b) flowing the degradation gas flow onto the cathode material at the set temperature till the weight measurement of the cathode material is stable;
c) stopping the degradation gas flow and starting a primary gas flow onto the cathode material at the set temperature, wherein the primary gas flow contains oxygen;
d) flowing the primary gas flow onto the material at the set temperature till the weight measurement of the cathode material is stable;
e) stopping the primary gas flow and starting a secondary gas flow at the set temperature till the weight measurement of the cathode material is stable while flowing the secondary gas flow, wherein the secondary gas flow does not contain oxygen; and
f) stopping the secondary gas flow and starting a primary gas flow at the set temperature till the weight measurement of the cathode material is stable while flowing the primary gas flow, and displaying and analyzing the data stream of the cathode material over time wherein $T(0i)$ is the time in which the weight change of cathode material begins from primary gas flow to secondary gas flow, $T(xi)$ is the time in which the cathode material has changed Y weight from primary gas flow to secondary gas flow, $T(0ii)$ is the time in which the weight change of cathode material begins from secondary gas flow to primary gas flow, and $T(xii)$ is the time in which the cathode material has changed Z weight from secondary gas flow to primary gas flow.

* * * * *